United States Patent [19]

Utting

[11] Patent Number: 4,491,400

[45] Date of Patent: Jan. 1, 1985

[54] DUAL-COLOR SENSITOMETER

[75] Inventor: George R. Utting, Satellite Beach, Fla.

[73] Assignee: Victoreen Incorporated, Cleveland, Ohio

[21] Appl. No.: 355,203

[22] Filed: Mar. 5, 1982

[51] Int. Cl.³ .................................... G03B 41/00

[52] U.S. Cl. .................................... 354/20; 313/507

[58] Field of Search .................. 354/20; 313/506, 507, 313/510; 356/443

[56] References Cited

U.S. PATENT DOCUMENTS 4,235,537 11/1980 Thompson .............................. 354/20

4,396,864 8/1983 Suntola et al. ....................... 313/506

FOREIGN PATENT DOCUMENTS 727826 2/1966 Canada ................................ 313/506

820015 9/1959 United Kingdom ................ 313/506

*Primary Examiner*—John Gonzales

*Attorney, Agent, or Firm*—Harness, Dickey & Pierce

[57] ABSTRACT

A dual-color photographic sensitometer for exposing a piece of test film to a known amount of light of a selectable one of two different colors. The multiple-step density gradient of the sensitometer is uniformly illuminated along its entire length by an electroluminescent lamp comprising a plurality of phosphor segments of varying widths which are electrically connected to form two sets, with each of the segments in each set adapted upon excitation to emit a single color light. The width of each segment of a set is determined in accordance with its distance from the multiple-step density gradient so that the multiple-step density gradient is illuminated substantially uniformly by each segment set.

8 Claims, 5 Drawing Figures

FIG. 1.
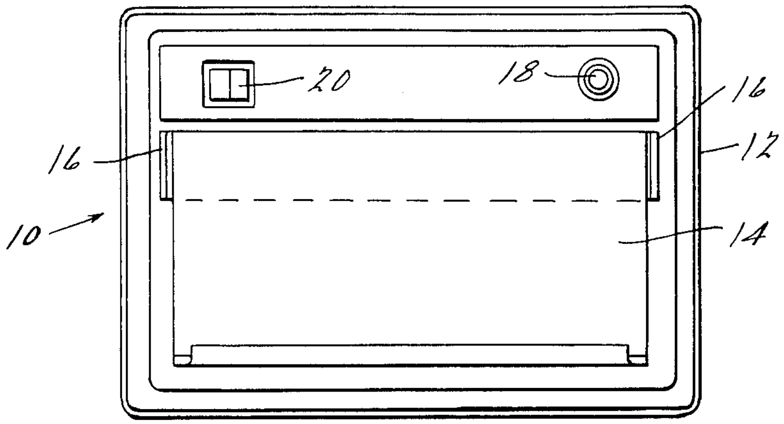
FIG. 2.
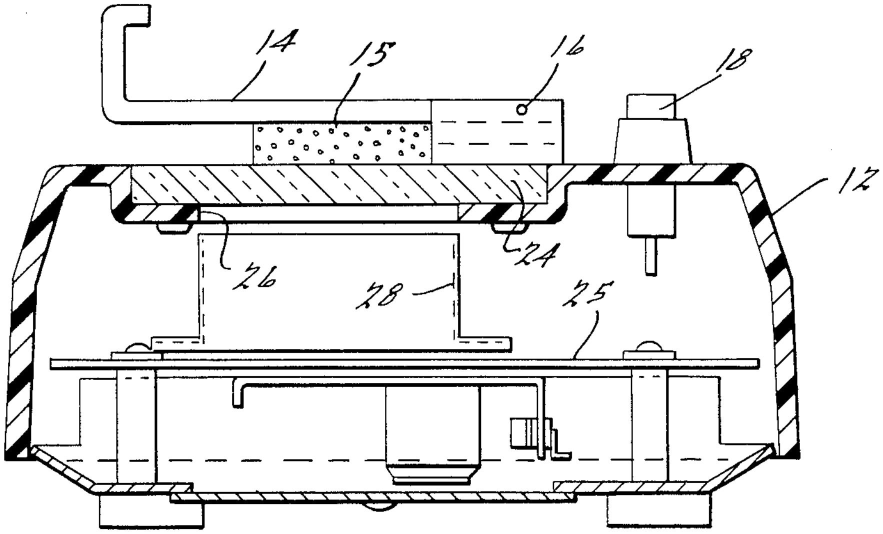
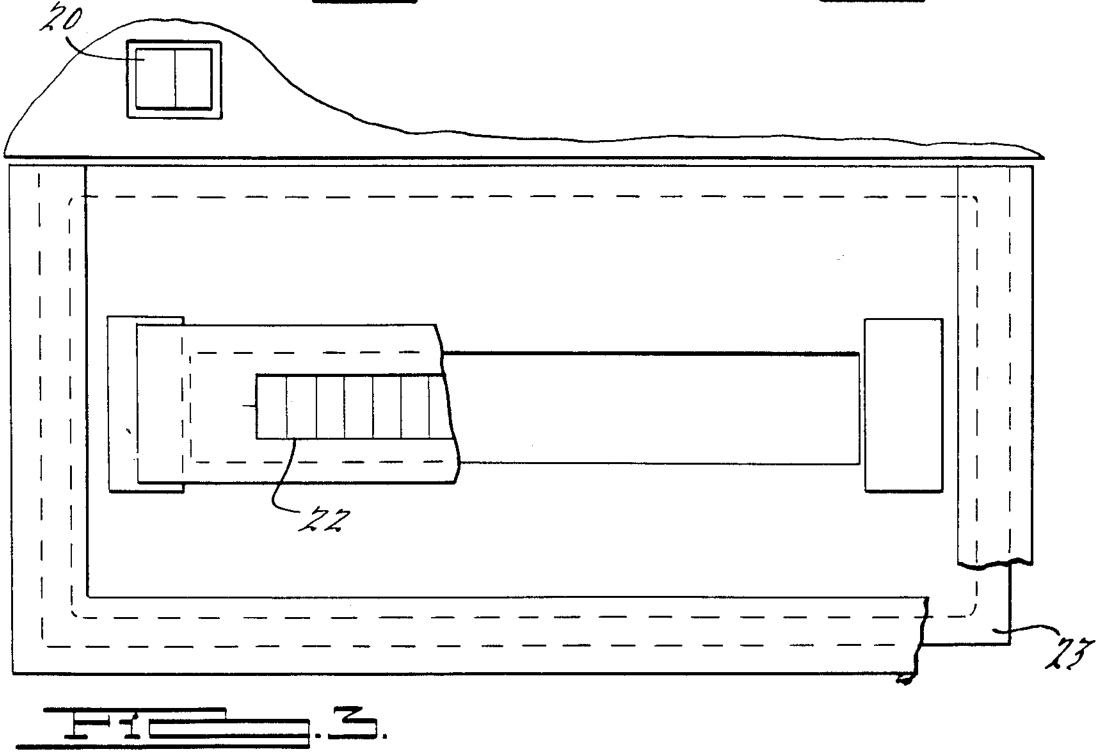
FIG. 3.

DUAL-COLOR SENSITOMETER

BACKGROUND AND SUMMARY OF THE INVENTION

The present invention relates to sensitometers and in particular to a dual color sensitometer having an improved electroluminescent lamp for uniformily illuminating a surface with either of two colors.

In the processing of film, particularly X-ray film, it is desirable, for quality control purposes, to use a device, known as a sensitometer, for exposing a piece of test film to a known amount of light of a known color. The film is typically exposed through a multiple-step density gradient known as a step tablet or step wedge. The exposed image of the graduated step tablet on the film is then measured with an optical densitometer which determines the density produced by the sensitometer exposure on the various steps of the step tablet. Through such densitometer measurements, the speed, contrast, and "base plus fog" of the film can be determined. As used herein, "base plus fog" refers to step "zero"; i.e., the area just past the least-exposed step on the sensitometer strip. Its density is the inherent density of the film base plus any additional density resulting from film age, natural radiation exposure, etc.

Densitometer measurements of sensitometer exposures are commonly used in quality control of routine photographic processes, such as the use of automatic processors for the processing of X-ray film. The measurements are typically made each day and plotted to assess daily and weekly processor variations to determine if a processor or film problem is present.

In general, there are two different kinds of photographic film used in X-ray and other applications. One is sensitive mainly to blue light and the other is also sensitive to green light. The most desirable wavelength for exposing blue film is 450 nanometers while the most desirable wavelength for exposing green sensitive film is 550 nanometers. Since both blue and green light sensitive film are frequently used, it is desirable to provide a sensitometer that can selectively emit light in either the blue or green region.

A common type of light source for use in a sensitometer is an electroluminescent lamp. An electroluminescent lamp is a light source consisting of a phosphor disposed between two conductive electrodes, with one electrode being transparent. When an AC voltage is applied between the electrodes the phosphor emits light. While the wavelength at which most electroluminescent phosphors emit light is independent of the drive frequency of the AC signal, phosphors have been developed which exhibit a distinct color shift with variations in the frequency of the signal applied to the lamp. However, such color shifts are relatively small in magnitude. For example, a typical lamp which emits light at a wavelength of 480 nm when operated at 60 Hz. may emit light at a wavelength of 505 nm when operated at 400 Hz. Prior art dual color sensitometers have been developed which employ electroluminescent phosphors that operate under this principle. The disadvantage with this approach, however, is that it is difficult to achieve the desired degree of shift in wavelength appropriate for blue and green sensitive films. In addition, control of exposure times, which must necessarily be short to avoid the occurrence of reciprocity failure in the film, becomes extremely critical as the frequency of the drive signal is reduced. For example, for a half second exposure at 60 Hz., only 30 voltage cycles will be applied to the lamp, and an error of only ±1 cycle will result in approximately a ±3% error in the light produced by the lamp. Thus, it will be appreciated that the potential for reciprocity failure or inconsistent exposure is increased with such prior art units which use drive frequencies as low as 20 Hz.

The present invention seeks to avoid these problems by providing an improved dual color sensitometer having an electroluminescent lamp that is capable of selectively producing either of two distinct colors upon excitation from a single relatively high frequency AC signal. In particular, the electroluminescent lamp according to the present invention includes a plurality of phosphor elements in the shape of elongated strips. The elements are electrically divided into two sets, one for uniformly illuminating the surface with a first color (e.g., blue) and the other for illuminating the surface with a second color (e.g., green). In the preferred embodiment, all of the electroluminescent phosphor elements produce a single blue color upon excitation. However, one set of elements is covered with a second nonelectroluminescent phosphor adapted to emit light of a longer wavelength than the excitation color, preferably in the green color range. In addition, to insure a uniformity of light along the entire length of the graduated step tablet, the widths of the elongated phosphor elements vary in relation to their distance from the step tablet according to the inverse square law so that the elements farthest from the step tablet emit proportionately greater amounts of light.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a plan view of a sensitometer incorporating an electroluminescent lamp according to the present invention;

FIG. 2 is an exposed side view of the sensitometer shown in FIG. 1;

FIG. 3 is a view of the top surface of the sensitometer with the cover removed to expose the step tablet;

DETAILED DESCRIPTION OF THE PREFERRED EMBODIMENT

Figure 4:
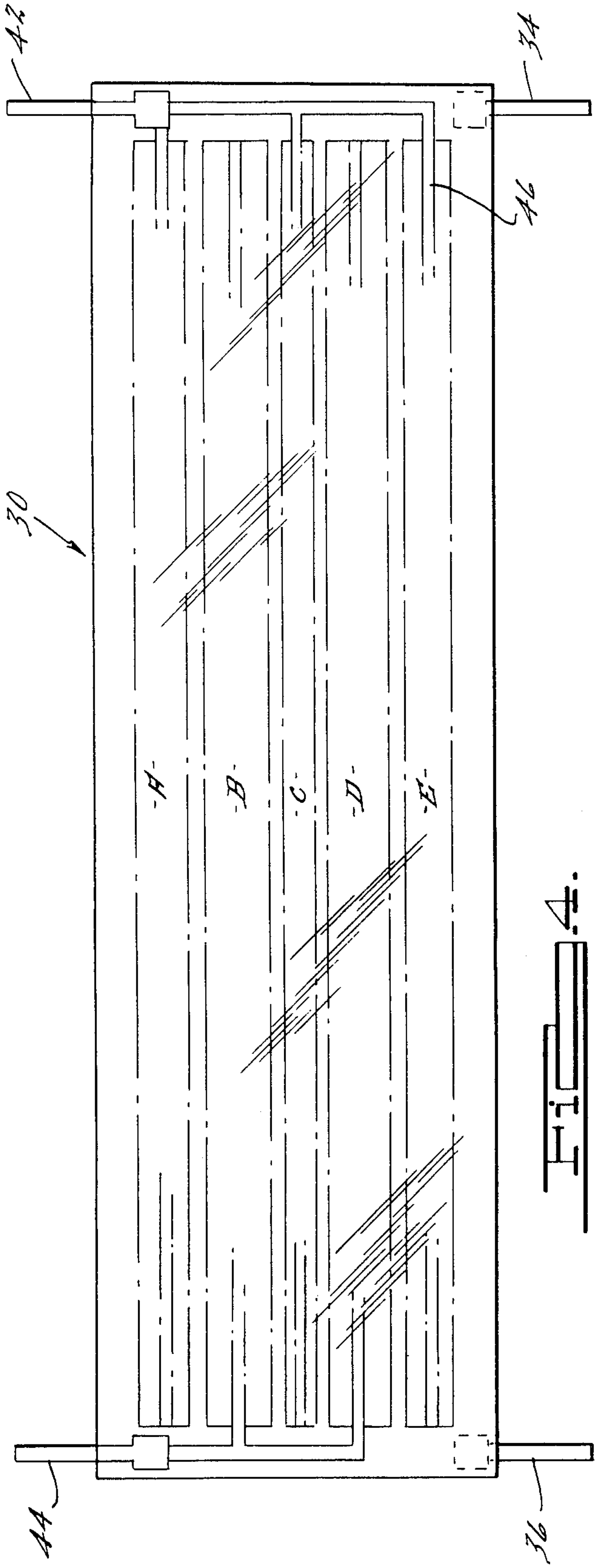
FIG. 4 is a plan view of an electroluminescent lamp according to the present invention.

Referring to FIGS. 1-3 a dual-color sensitometer 10 incorporating an electroluminescent lamp according to the present invention is shown. The sensitometer 10 disclosed in the preferred embodiment herein is particularly designed for making reproducible exposures on X-ray film, principally for use in quality control of an X-ray processing system. The sensitometer 10 is preferably portable and battery operated, and includes a housing 12 having a cover 14 pivotally hinged thereto at 16. Also located on the top surface of the housing 12 is a pushbutton exposure switch 18 and a rocker-type selector switch 20 for selecting between blue and green. The cover 14 is pivotable upwards to expose a twenty-one

(21) step density gradient 22 (FIG. 3) commonly referred to as a "step tablet" or "step wedge". The step tablet 22 is mounted to the top side of a diffusion plate 24 which is in turn disposed in a recess formed in the top surface of the housing 12 (FIG. 2), so that the top surface of the housing under the cover 14 is completely flat. A resilient pressure pad 15 is secured to the underside of the cover 14 to insure that the test film is held flush against the diffusion plate 24 when the cover 14 is closed. A rectangular-shaped opening 26 is formed in the bottom of the recess to permit the passage of light from the electroluminescent lamp through to the diffusion plate 24 and step tablet 22. A panel mask 23, consisting of a sheet of aluminum foil, is also disposed on top of the diffusion plate 24 to block light except in the area around the step tablet 22.

Mounted a predetermined distance below the diffusion plate 24 is a printed circuit board 25 containing an electroluminescent lamp according to the present invention, and the solid-state electronic components (not shown) in the control circuit for generating the drive signal for the lamp. The electroluminescent lamp is connected to the p.c. board 25 so as to be located directly below the diffusion panel opening 26. A nonspecular reflective surface 28 extending completely around the periphery of the lamp is also mounted to the p.c. board 25 to increase the uniformity and intensity of light impinging upon the step tablet 22.

The detailed disclosure of the control circuit has been omitted since its design is well within the skill of one versed in the art. It is preferred, however, that the control circuit be adapted to produce an AC drive signal at a predetermined frequency, herein 1000 Hz., for a predetermined exposure time; e.g., 0.2 seconds. The control circuit output is also preferably used to drive a small speaker so that a short tone is emitted to provide an audible confirmation of an exposure. In addition, the control circuit preferably includes a delay circuit so that a second exposure cannot be produced within a predetermined time period (e.g., two seconds) after the original exposure to prevent the possibility of double exposures.

Figure 5:
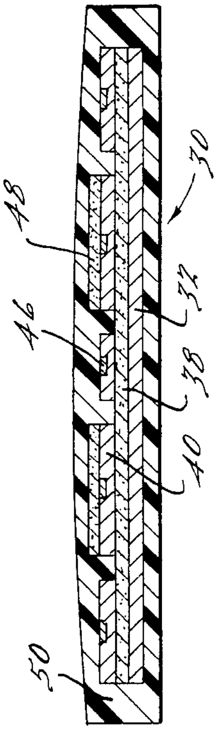
FIG. 5 is a sectional view of the electroluminescent lamp shown in FIG. 4 taken along line 5—5, with the thicknesses of the various layers of the lamp exaggerated for purposes of clarity and explanation.

Referring to FIGS. 4 and 5, the electroluminescent lamp 30 according to the present invention is shown. The cross-sectional view of the lamp illustrated in FIG. 5 depicts the thicknesses of the various layers of the lamp in a greatly exaggerated manner for purposes of clarity and explanation. The bottom layer of the rectangular shaped lamp consists of an electrically conductive foil 32 which has connected thereto a pair of conductors 34 and 36 at opposite ends of the lamp. Disposed on the conductive foil 32 is a layer of electroluminescent phosphor 38 adapted to emit a blue color upon excitation. in the preferred embodiment, the blue color phosphor 38 is selected to emit a wavelength of 455 nanometers. A transparent conductive material 40 is then disposed on the blue phosphor layer 38 in a plurality of elongated strip segments of varying predetermined widths. In the preferred embodiment, there are at least five separate segments, herein designated "A–E", with segments "A, C and E" connected in parallel via conductor 42, and segments "B and D" connected in parallel via conductor 44. A thin low resistance electrode strip 46 is embedded in the middle of each transparent electrode segment to minimize electrical resistance along the length of the segments. Disposed on segments "B and D" over the electrodes is a secondary nonelectroluminescent phosphor 48 which, upon light excitation from the blue electroluminescent phosphor 38, emits a green color, preferably at a wavelength of 550 nanometers. Finally, the entire electroluminescent lamp 30 is coated with a protective layer of transparent plastic 50.

Thus, it will be appreciated that when an AC potential is applied across conductors 34 and 42, segments "A, C and E" will emit a blue color light and when the AC signal is applied across conductors 36 and 44, segments "B and D" will emit a green color light. In addition, because the basic light source comprises a single blue electroluminescent lamp, a relatively high frequency excitation signal can be used for selectably producing either the blue or a green light. Moreover, the use of a relatively high frequency excitation signal, which may be on the order of 1000 Hz., makes the control of light output much less critical than with low frequency drive signals. For example, with a 1000 Hz. drive signal, an error of a single cycle in an exposure time of 0.2 seconds results in an error in light output of only 0.5%.

It will be appreciated, however, by those skilled in the art that the present electroluminescent lamp 30 can be readily modified to eliminate the secondary nonelectroluminescent green phosphor 48 by substituting an electroluminescent green phosphor for the blue phosphor between the foil layer 32 and transparent conductors 40 in lamp segments "B and D". Of course, if this alternative structure is used, it is preferable to select a green electroluminescent phoshor material that will emit light at the prescribed wavelength when excited by the same frequency drive signal used for exciting the blue electroluminescent phosphor 30 in lamp segments "A, C and E". The former embodiment is preferred, however, because it is easier and hence cheaper to manufacture.

As indicated in FIG. 2, the electroluminescent lamp 30 is spaced from the diffusion plate 24 upon which the step tablet 22 is mounted. Accordingly, the configuration of the lamp segments "A–E" is important to insure that the lamp produces a uniform amount of light along the entire length of the step tablet 22 regardless of which set of lamp segments is energized. In particular, it will be noted, as indicated previously, that the lamp segments "A–E" vary in width. The reason for this is that the segments are at different distances from the step tablet, and therefore, because of the inverse square law, more light must be produced by those lamp segments farthest from the step tablet. Thus, the width of the outside blue segments "A and E" is greater than the width of the middle blue segment "C" and is inversely proportional to the square of the distance of the segments from the step tablet. Since the two green segments "B and D" are spaced an equal distance from the step tablet, their widths are the same. Finally, it will be noted that, because of the addition of the reflective surface 28 around the perimeter of the lamp between the lamp and the diffusion plate 24, the widths of the various lamp segments must be experimentally altered somewhat from the theoretical value determined according to the inverse square law in order to produce the optimum light uniformity on the step tablet 22.

While the above description constitutes the preferred embodiments of the present invention, it will be appreciated that the invention is susceptible to modification, variation and change without departing from the proper scope or fair meaning of the accompanying claims.

I claim:

1. A dual-color photographic sensitometer comprising a multiple-step density gradient and an electroluminescent lamp spaced a predetermined distance from said multiple-step density gradient for uniformly illuminating said multiple-step density gradient with a selectable one of two different color light sources; said electroluminescent lamp comprising a plurality of elongated segments electrically connected so as to define two sets of segments with each set of segments emitting a different color light; the widths of each of said segments being determined in accordance with the distance of each segment from said multiple-step density gradient.

2. A dual-color photographic sensitometer comprising a multiple-step density gradient and an electroluminescent lamp spaced a predetermined distance from said multiple-step density gradient for uniformly illuminating said multiple-step density gradient with a selectable one of two different color light sources; said electroluminescent lamp comprising: a first electrically conductive layer; a second electroluminescent phosphor layer disposed on said first layer and adapted upon excitation to emit light in one of said two different colors; a third transparent conductive layer disposed on said second layer and defining a plurality of segments electrically connected so as to define two sets of segments; and a fourth nonelectroluminescent phosphor layer disposed on the segments in one of said sets and adapted upon light excitation from said second electroluminescent phosphor layer to emit light in the other of said two different colors.

3. The photographic sensitometer of claim 2 wherein the area of each segment of a set is determined in accordance with the distance of that segment from said multiple-step density gradient so that said multiple-step density gradient is illuminated substantially uniformly along its entire length and width.

4. The photographic sensitometer of claim 3 wherein said multiple-step density gradient is in the form of an elongated rectangle and the segments of said electroluminescent lamp comprise elongated strips of varying widths.

5. The photographic sensitometer of claim 4 wherein said electroluminescent lamp comprises five parallel segments with a first set consisting of the two outer and one middle segment and a second set consisting of the remaining two segments.

6. The photographic sensitometer of claim 5 wherein the two segments in said second set have substantially the same width, the two outer segments in said first set have substantially the same width, and are wider than the remaining middle segment in said first set.

7. An photographic sensitometer comprising a multiple-step density gradient and an electroluminescent lamp spaced a predetermined distance from said multiple-step density gradient for uniformly illuminating said multiple-step density gradient with a selectable multiplicity of colors; said electroluminescent lamp including:

a first electrically conductive layer;

a second electroluminescent phosphor layer disposed on said first layer;

a third transparent electrically conductive layer disposed on said second layer and forming a plurality of segments electrically connected so as to define a multiplicity of electroluminescent segment sets, and wherein the areas of said segments are nonuniform with the area of each segment of a set being determined in accordance with the distance of that segment from said multiple-step density gradient; and a first conductor connected to said first layer and a multiplicity of additional conductors connected to each of said multiplicity of segment sets, such that selectable application of a drive signal across said first conductor and one of said multiplicity of additional conductors excites a selected one of said segment sets.

8. The photographic sensitometer of claim 7 further including a fourth nonelectroluminescent phosphor layer disposed on the segments in one of said segment sets and adapted upon light excitation from said second electroluminescent phosphor layer to emit light in a color distinct from the color of light emitted by said electroluminescent phosphor.

* * * * *